United States Patent [19]
Sudo et al.

[11] Patent Number: 5,444,346
[45] Date of Patent: Aug. 22, 1995

[54] CONTROL SYSTEM FOR ACTUATOR APPLICABLE TO SERVO SYSTEM HAVING LOW RESOLUTION SENSOR AND IN FEEDBACK CONTROL MODE

[75] Inventors: Hideki Sudo; Yoshinori Yamamura, both of Kanagawa, Japan

[73] Assignee: Nissan Motor Co., Ltd., Yokohama, Japan

[21] Appl. No.: 998,914

[22] Filed: Dec. 30, 1992

[30] Foreign Application Priority Data

Jan. 9, 1992 [JP] Japan ................. 4-001884

[51] Int. Cl.$^6$ ............................. G05B 5/01
[52] U.S. Cl. .................... 318/616; 318/128
[58] Field of Search ........... 318/128, 127, 587, 560, 318/561, 616, 632, 601; 324/207.12; 280/707, 714; 434/45, 49; 360/78, 77.04, 69; 364/724, 734

[56] References Cited

U.S. PATENT DOCUMENTS

| | | | |
|---|---|---|---|
| 4,307,329 | 12/1981 | Taylor | 318/587 |
| 4,375,081 | 2/1983 | Blesser | 364/724 |
| 4,651,698 | 3/1987 | McDermott et al. | 123/425 |
| 4,691,152 | 9/1987 | Ell et al. | 318/616 |
| 4,792,737 | 12/1988 | Goff et al. | 318/560 |
| 4,890,172 | 12/1989 | Watt et al. | 360/77.04 |
| 5,098,119 | 3/1992 | Williams et al. | 280/714 |
| 5,115,193 | 5/1992 | Bean et al. | 324/207.12 |
| 5,126,641 | 6/1992 | Putman et al. | 318/128 |
| 5,209,661 | 5/1993 | Hildreth et al. | 434/45 |
| 5,218,595 | 1/1993 | Takehara | 280/707 |

*Primary Examiner*—William M. Shoop, Jr.
*Assistant Examiner*—John W. Cabeca
*Attorney, Agent, or Firm*—Foley & Lardner

[57] ABSTRACT

In a control system for an actuator applicable to a servo system in which a low resolution sensor and/or an operation detection signal having noise components is used as a feedback signal, a low-pass filter is disposed in a feedback loop of the servo system whose cut-off frequency is varied according to an operating condition of the actuator, e.g., an operation speed of the actuator.

10 Claims, 9 Drawing Sheets

CONTROL SYSTEM FOR ACTUATOR APPLICABLE TO SERVO SYSTEM HAVING LOW RESOLUTION SENSOR AND IN FEEDBACK CONTROL MODE

BACKGROUND OF THE INVENTION

1. Field of The Invention

The present invention relates to a control system for an actuator applicable to a servo system in which a low resolution sensor is used and/or an operation detection signal having a large number of noise components is used for a feedback signal.

2. Description of the Background Art

A Japanese paper titled "Robust Control for Automotive Actuator" which is announced in the "Tenth adaptive control symposium" (held from Jan. 31, 1990 to Feb. 2, 1990 in Tokyo, Japan) exemplifies a previously proposed actuator control system.

In the disclosed actuator control system, a method of controlling the actuator of a DC motor type four-tire-wheel steering actuator includes a model adaptive control to which a robust compensator is used to achieve a robust control against the disturbance so that influences of the disturbance and frictional motion of the actuator itself can hardly be received.

Figure 4A:
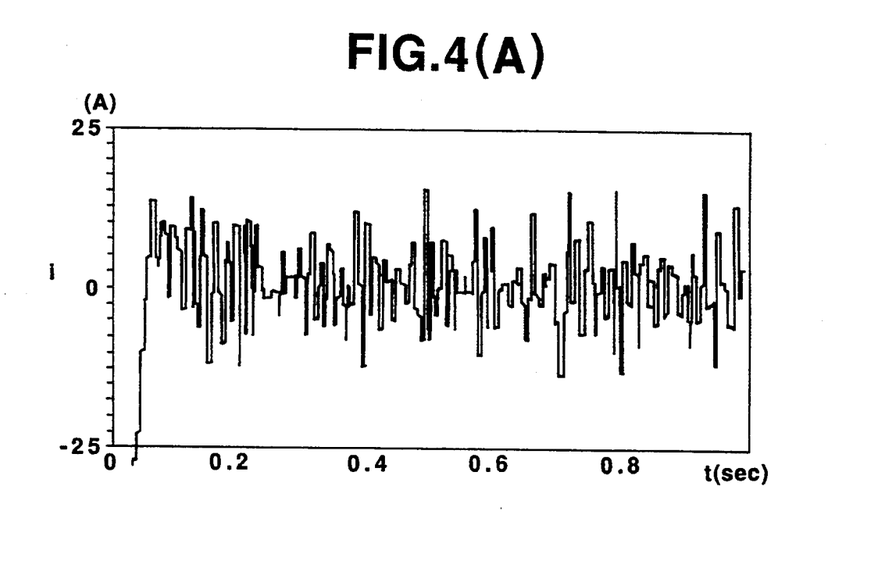

However, since a sensor providing a low resolution and great number of noise components is used as operation detection means for the actuator in the actuator control system disclosed in the above-identified Japanese Paper, a motor current command value i* supplied to the DC motor to drive the actuator violently vibrates, a simulation result of which is shown in FIG. 4 (A). Then, this vibration causes the actuator itself to be vibrated and an abnormal sound is generated therefrom.

Figure 5A:
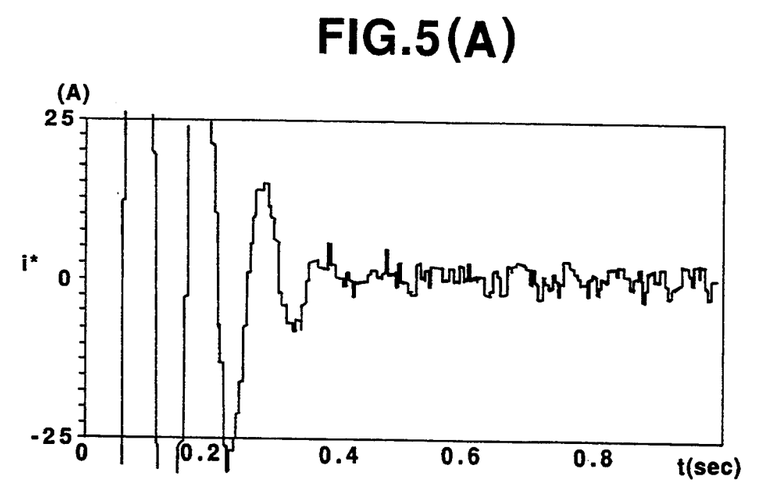
Figure 5B:
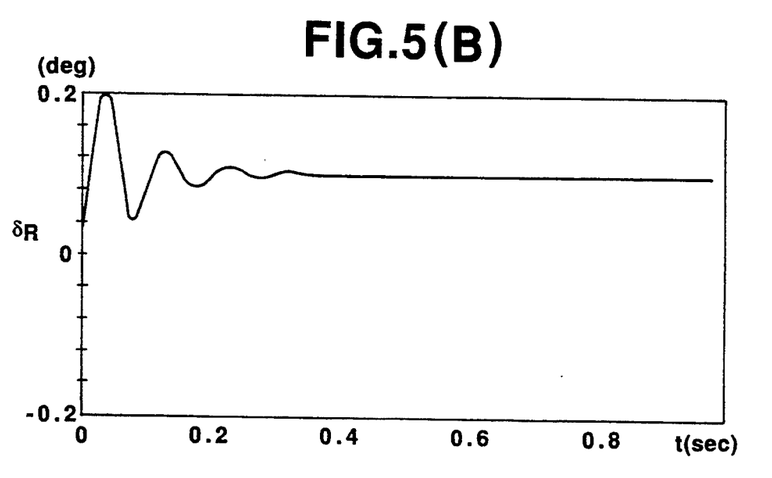

In addition, in a case where a low pass filter having a low cut-off frequency is used to eliminate sensor noises, a response of the actuator becomes vibratile due to an insufficient damping force of the control system when the command value i* is abruptly changed, as appreciated from a simulation result shown in FIG. 5 (B).

SUMMARY OF THE INVENTION

It is, therefore, a principal object of the present invention to provide a system for controlling an actuator applicable to a servo system in which an operation detection signal of a controlled object derived from a sensor having a low resolution and having great numbers of noise components and which can achieve prevention of vibration in the actuator irrespective of an operating state of the actuator and favorable response of the actuator.

The above-described object can be achieved by providing a control system for an actuator, the actuator being operated in response to an operation signal input thereto, comprising: a) first means for detecting an operating condition state of the actuator; b) second means for calculating the operation signal on the basis of at least detection signal derived from said first means; c) third means for calculating a condition signal on the basis of an operating condition of the actuator; and d) fourth means which is so constructed as to eliminate noise components from the detection signal derived from said first means and as to supply the noise eliminated detection signal to said second means, said third means having a variable noise eliminating characteristic which is varied on the basis of the condition signal derived from said third means.

BRIEF DESCRIPTION OF THE DRAWINGS

FIG. 4 (A) and FIG. 4 (B) are characteristic graphs on a step response simulation result of a current command value by means of the actuator control system in the first preferred embodiment in which a low-pass filter is not used and on another step response simulation result of the rear tire wheel steering angle by means of the actuator control system in the first preferred embodiment in which the low-pass filter is not used, respectively.

FIGS. 5 (A) and 5 (B) are characteristic graphs on a step response simulation result of the current command value by means of the actuator control system in the first preferred embodiment in which the low-pass filter having a constant cut-off frequency is used and on another step response simulation result of the rear tire steering wheel angle by means of the same actuator control system.

FIGS. 6 (A) and 6 (B) are characteristic graphs on a step response simulation result of the current command value by means of the actuator control system in the first preferred embodiment and on another step response simulation result of the current command value, respectively.

FIG. 9 (A) and FIG. 9 (B) are characteristic graphs on a step response simulation result of the current command value by means of the actuator control system in the second preferred embodiment having no low-pass filter a step response simulation result of the rear tire wheel steering angle by means of the same actuator control system having no low-pass filter, respectively.

FIG. 10 (A) and FIG. 10 (B) are characteristic graphs on a step response simulation result of the current command value by means of the actuator control system in the second preferred embodiment having the low-pass filter of the constant cut-off frequency and on a step response simulation result of the rear tire wheel steering angle by means of the same actuator control system having the low-pass filter of the constant cut-off frequency.

FIGS. 11 (A) and 11 (B) are characteristic graphs on a step response of the current command value by means of the actuator control system in the second preferred embodiment and on another step response of the rear tire wheel steering angle by means of the actuator control system in the second preferred embodiment shown in FIGS. 7 and 9, respectively.

DESCRIPTION OF THE PREFERRED EMBODIMENTS

Reference will be made to the drawings.

Figure 1:
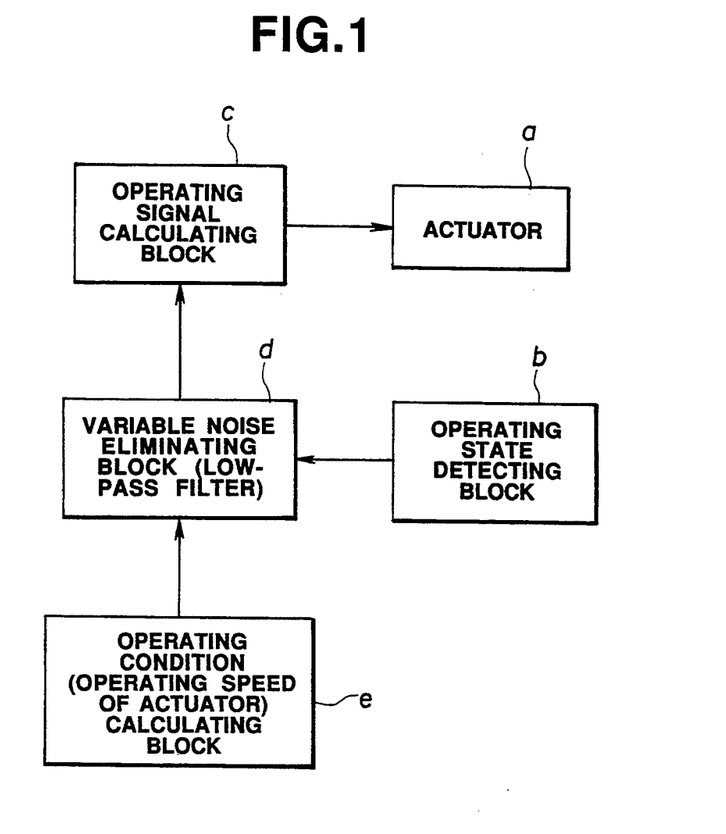
FIG. 1 is a conceptual view of an actuator controlling system according to the present invention.

FIG. 1 functionally shows the concept of an actuator controlling system according to the present invention.

The actuator controlling system according to the present invention includes: an actuator 'a' which is so constructed as to operate in accordance with an operation signal; operation detection means 'b' for detecting an operating state of the actuator 'a'; an operation signal calculating means 'c' for calculating the operation signal; operation condition calculating means 'e' for calculating the condition signal; and variably noise eliminating means d for eliminating the noises from an output signal of the operation detection means 'b'.

Figure 2:
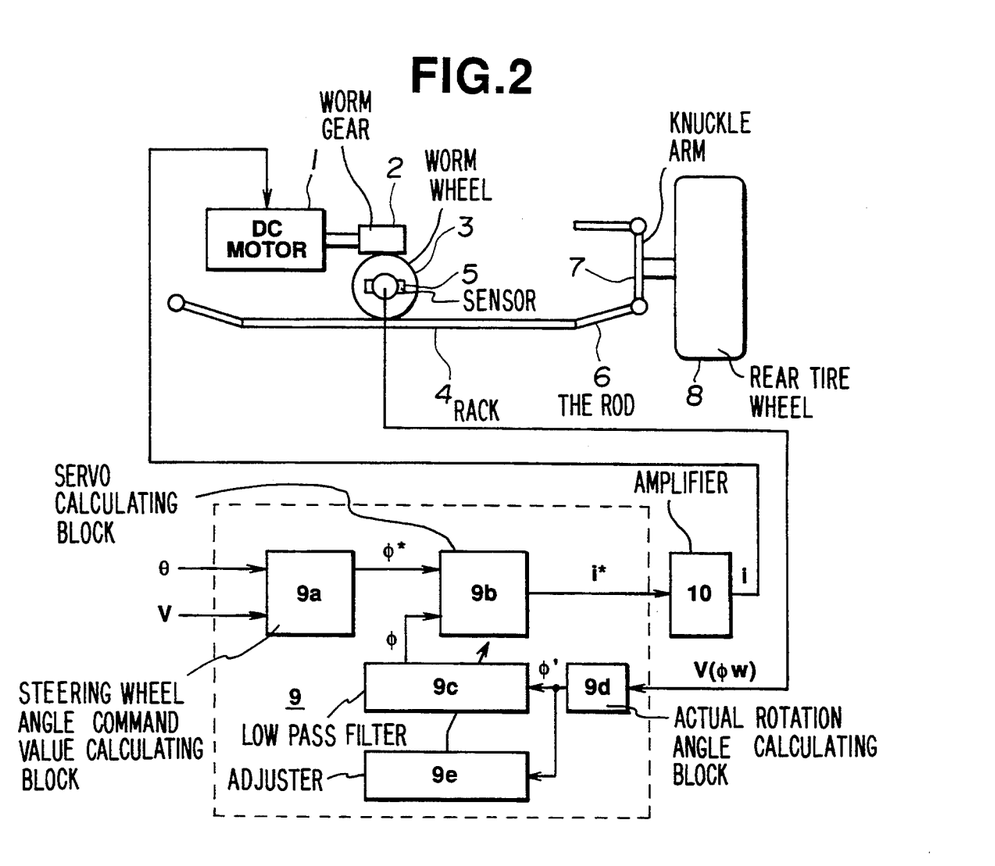
FIG. 2 is a whole system configuration of the actuator controlling system which is applicable to a vehicular rear tire wheel steering control system in a first preferred embodiment according to the present invention.

FIG. 2 shows a whole system configuration of a rear tire wheel steering angle control system to which the actuator controlling system is applicable in a first preferred embodiment according to the present invention.

In FIG. 2, numeral 1 denotes a DC motor (equivalent to an actuator), numeral 2 denotes a worm gear, numeral 3 denotes a worm wheel, numeral 4 denotes a rack, numeral 5 denotes a worm wheel rotation sensor constituted by a potentiometer, numeral 6 denotes a tie rod, numeral 7 denotes a knuckle arm, numeral 8 denotes a rear tire wheel, numeral 9 denotes a controller, and numeral 10 denotes PWM (Pulse Width Modulation) current control amplifier. An actuator is constituted by the DC motor 1, worm gear 2, worm wheel 3, and rack 4.

A rotary motion of the DC motor 1 is converted into a linear motion of the rack 4 via the worm gear 2 and worm wheel 3. The rack 4 accordingly pushes and pulls vibratile knuckle arm 7 via the tie rod 6 to be converted into the steering motion of the tire wheel 8.

The worm wheel rotation sensor 5 detects an angle of rotation of the DC motor 1 and outputs a voltage value corresponding to an angle of rotation of the worm wheel 3.

The controller 9 includes: a rear tire steering wheel angle command value calculating block 9a (equivalent to operation signal calculating means); a servo calculating block 9b for positioning the rear tire wheel steering angle; a low-pass filter 9c (equivalent to variable noise eliminating means); and a motor actual rotation angle calculating block 9d.

The controller 9 has the rear tire steering wheel angle command value calculating block 9a which calculates a rear tire steering angle command value $\delta_R^*$ according to a method, e.g., disclosed in pages 7, 8, and 9 of a Japanese Patent Application First Publication No. Heisei 3-25078 from a steering angle of a vehicular steering wheel system and vehicle speed (also disclosed in a U.S. patent application Ser. No. 07/758, 454 now allowed, the disclosure of which is herein incorporated by reference) and calculates a motor angle of rotation command value $\phi^*$ which is a converted value of the rear tire wheel steering angle command value $\phi_R^*$.

The servo calculating block 9b of positioning the rear tire wheel steering angle calculates a current command value $i^*$ to flow into the DC motor 1 from the motor rotation angle command value $\phi^*$ and from the actual motor rotation angle $\phi$ and inputs it to the PWM current control amplifier 10.

The low-pass filter 9c is a filter through which a digital value of the motor rotation angle $\phi'$ is supplied from the motor actual rotation angle calculating block 9d to output an actual motor rotation angle $\phi$.

The low-pass filter 9c has such a characteristic that its cut-off frequency is continuously (proportionally) increased in accordance with an increase in a speed of rotation of the motor 1, specifically, its cut-off frequency is set as 10 Hz when the motor rotation speed is zero and as direct pass when the motor rotation speed exceeds 2000 rpm. The motor rotation speed is calculated, e.g., by an adjuster 9e (equivalent to operation condition calculating means) on the basis of $\{\phi'(k) - \phi'(k-1)\}/T$ and the cut-off frequency of the low-pass filter 9c is varied on a real time base.

In addition, the differential action Kd.S can be approximated to $Kd.(1-z^{-1})/T$.

In the proportional action, the gain Kp in a continuous time series can directly be applied thereto.

Figure 3:
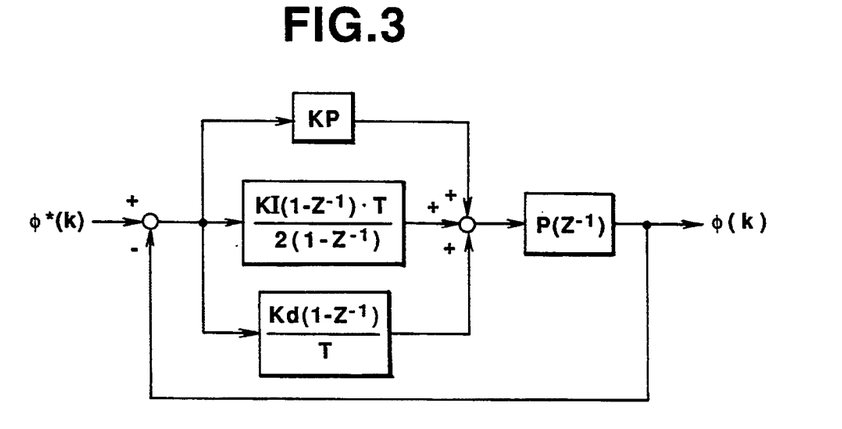
FIG. 3 is a circuit block diagram indicating a servo control system of positioning a rear tire wheel steering angle in the first preferred embodiment in a digital PID control mode.

Hence, if a combination of both rear tire wheel steering mechanism in FIG. 2 and PWM current control amplifier 10 is a controlled object $P(z^{-1})$, the rear tire wheel steering angle positioning servo system using the PID controller can be achieved as shown in FIG. 3.

A design of the PID controller determines values of respective gains Kp, KI, and Kd so that characteristics of the system to be controlled meet its specification. It is desirable not to receive influences such as road surface disturbance in the rear tire wheel steering angle positioning servo system. Therefore, the values of respective gains Kp, KI, and Kd need to be relatively high.

Figure 4B:
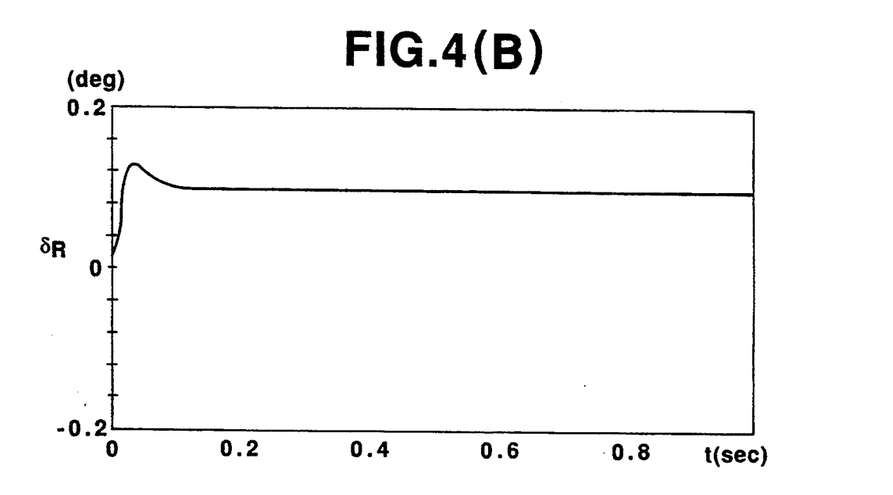

FIGS. 4 (A) and 4 (B) show simulation results of step responses in a case where a low-pass filter 9c is not operated but the input is directly output. If the sensor resolution is low, the current command value $i^*$ is very vibratile as appreciated from FIG. 4 (A). Such a vibratile current as the current command value $i^*$ needs to be avoided so as not to provide a cause of the noise or electrical noise.

FIGS. 5 (A) and 5 (B) show step response simulation results when the low-pass filter 9c is operated. It is noted that the cut-off frequency of the low-pass filter 9c is fixed to a constant value (10 Hz) and a steady state gain=1. The sensor resolution and noise level are the same as those shown in FIGS. 6 (A) and 6 (B), respectively.

In this case, the vibration level of the current command value is considerably suppressed as compared with FIGS. 4 (A) and 4 (B). However, it is not preferable for the response of the rear tire steering wheel to become vibratile. This is because the rotation speed of the DC motor 1 is not correctly fedback to the control system due to the influences of the low-pass filter 9c and an insufficient damping force is resulted.

Figure 6A:
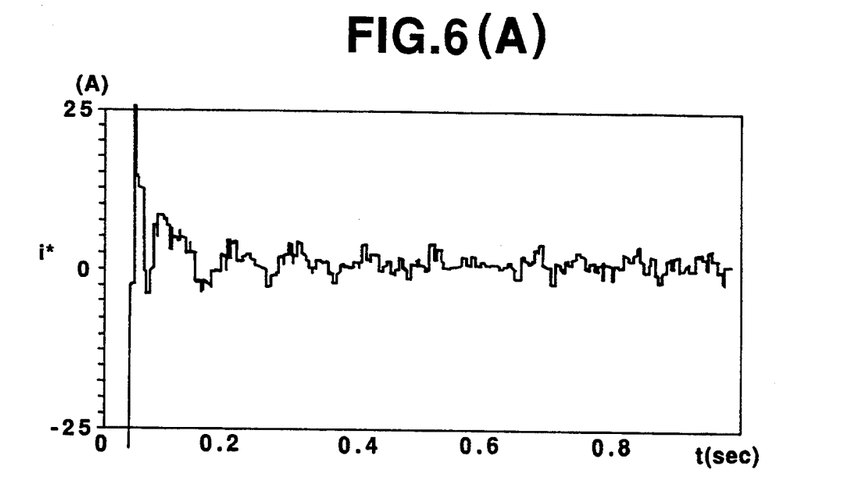
Figure 6B:
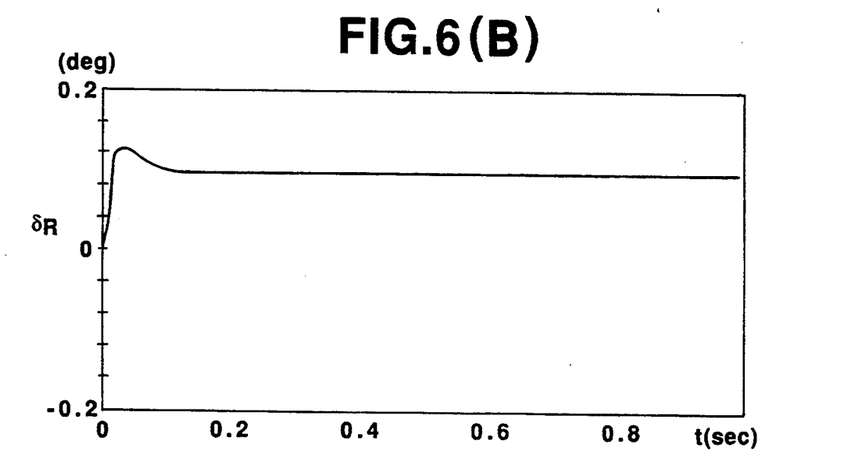

FIGS. 6 (A) and 6 (B) show results of simulations on step responses in the first preferred embodiment in which the characteristic of the cut-off frequency in the low-pass filter 9c becomes continuously increased as the rotation speed of the DC motor 1 becomes increased.

In this case, since the cut-off frequency of the low-pass filter 9c is set at 10 Hz when the motor rotation speed is zero and directly passing when the motor rotation speed exceeds 2000 rpm, the motor rotation speed can correctly be fedback to the control system suppressing the noise components at a low speed region in which the motor speed is low. The vibration level of the current command value $i^*$ is suppressed up to the same level as FIGS. 5 (A) and 5 (B). In addition, the response of the rear tire wheel steering angle is the same as FIGS.

4 (A) and 4 (B). The vibratile response raised in the case of FIGS. 5 (A) and 5 (B) cannot occur.

As described above, in the actuator control system in the first preferred embodiment, when the noise is eliminated from the output signal of the worm wheel rotation sensor 5, the low-pass filter 9c is used in which the cut-off frequency is continuously varied according to the motor rotation speed, the prevention of the vibration of the current command value i* in a low speed region in which the motor rotation speed is low and improvement in the convergence characteristic of the rear tire wheel steering angle $\delta_R$ at a high speed region In which the motor rotation speed is high can be achieved.

Irrespective of the motor rotation speed, an optimum actuator operation in a real time base can be secured.

Next, a second preferred embodiment of the actuator controlling system in which a disclosed technique used in "A robust control for automotive actuator" as described in the BACKGROUND OF THE INVENTION is applicable to the control rule of the rear tire wheel steering angle positioning servo calculating block 9b.

Since the whole system configuration is the same as shown in FIG. 2, the explanation thereof is omitted here.

Figure 7:
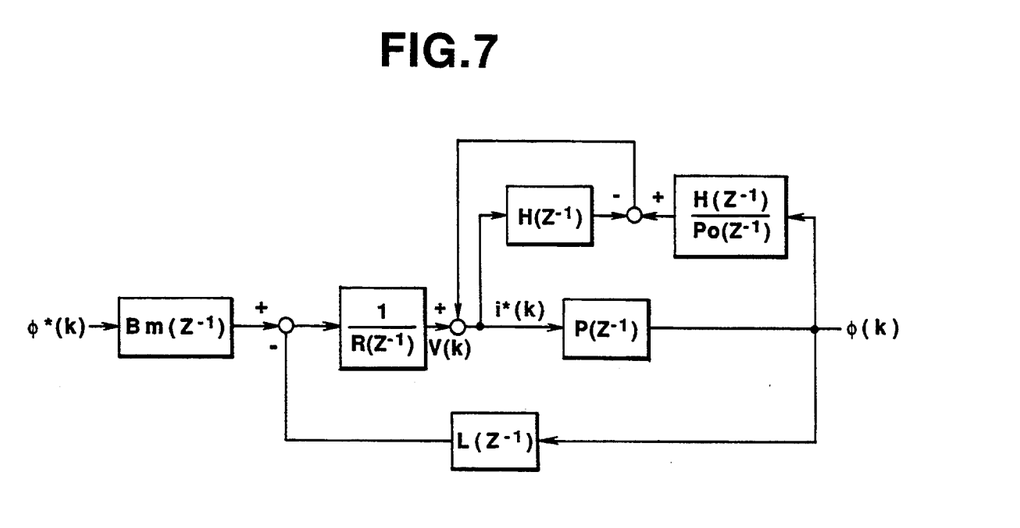
FIG. 7 is a circuit block diagram of a servo calculating block of positioning the rear tire wheel steering angle in the actuator control system in a second preferred embodiment.

FIG. 7 shows a block diagram of a rear tire wheel steering angle positioning servo calculating block 9b.

A modeling of the PWM current control amplifier 10 which is a controlled object of the rear tire wheel steering positioning and of the rear tire wheel steering mechanism of FIG. 2 in a continuous time series can be carried out in the following.

Suppose that a lag of the PWM current control amplifier 10 is sufficiently minor and its transfer characteristic of the motor positioning servo system is 1 at a practical frequency is 1. An equation (1) will be established when the modeling described above is carried out.

Next, a motion equation of the rear tire wheel steering mechanism shown in FIG. 2 will be established as in an equation (2) provided that cornering force and tire friction are equal to zero.

In the equation (2), $K_T$: motor torque constant; $\ddot{\phi}$: motor rotation acceleration; $\dot{\phi}$: motor rotation speed, J: motor axle converted actuator inertia, D: motor axle converted actuator viscosity coefficient, K: spring constant, and i: motor current.

When the equation (2) is Laplace transformed and the result of Laplace transform is arranged as in an equation (3) of the attached table 1.

Since the controller 9 is constituted by a digital computer, the equation (3) is in a discrete tire series to transform the equation (3) using a zero-order holder into an equation (4) of the attached table 1.

In the equation (4), Z : z transform ($z^{-1}$ denotes a lag operator), and $(1-z^{-1})/S$ : zero-order holder.

Rewriting the equation (4) to derive an equation (5) of the attached table 1:

In the equation (5), the following equations (6) through (8) recited in the attached table 1 are established.

Then, the equation (5) can be substituted by an equation (9) according to the equations (6) through (8).

A desired characteristic in a positioning of the rear tire wheel steering angle can be represented by an equation (10) of the attached table 2.

A gain can be derived as in an equation (10) of the attached table 2. In the equation (10), $G_m(S) = \omega_n^2/(S^2 + 2\zeta\omega_n S + \omega_n^2)$ In FIG. 7, a gain derivation by which a transfer characteristic from $\phi^*(k)$ to $\phi(k)$ coincides with the desired characteristic of the equation (10) can be carried out In the following.

Suppose now that, in FIG. 7, $H(z^{-1})$ and $H(z^{-1})/P_0(z^{-1})$ may be neglected (these denote robust compensators and can be designed independently from the gain derivation calculation as will be described later).

In FIG. 7, two equations (11) and (12) are established.

Substituting the equation (11) into the equation (12), an equation (13) is established as a transfer characteristic from $\phi^*(k)$ to $\phi(k)$.

In order to make the equation (13) coincident with the desired transfer characteristic (10), Bm ($z^{-1}$), R ($z^{-1}$), and L ($z^{-1}$) may be derived which satisfies equations (14) and (15) of the attached table 3.

Supposing that equations (16) and (17) of the attached table 3 are established, a left side of the equation (15) is expressed in an equation (18) of the attached table 3.

Hence, when both coefficients recited in the the equation (18) and in the right side of the equation (15) are mutually compared with one another, equations of (19), (20), and (21) of the attached table 3 are established.

Thereafter, terms of r, $L_0$, and $L_1$ are derived as in equations (22), (23), and (24) which satisfy the equations (19), (20), and (21).

Next, a part of the control system, i.e., a robust compensator which compensates (provides a low sensitivity) for an influence from the disturbance or parameter variation will be described below.

An equation (25) represents a controlled object $P(z^{-1})$.

In the equation (25), $P(z^{-1}) = P_0(z_{-1})(1+\Delta) + di$, $\Delta$ denotes a modeled error and di denotes a disturbance.

Figure 8:
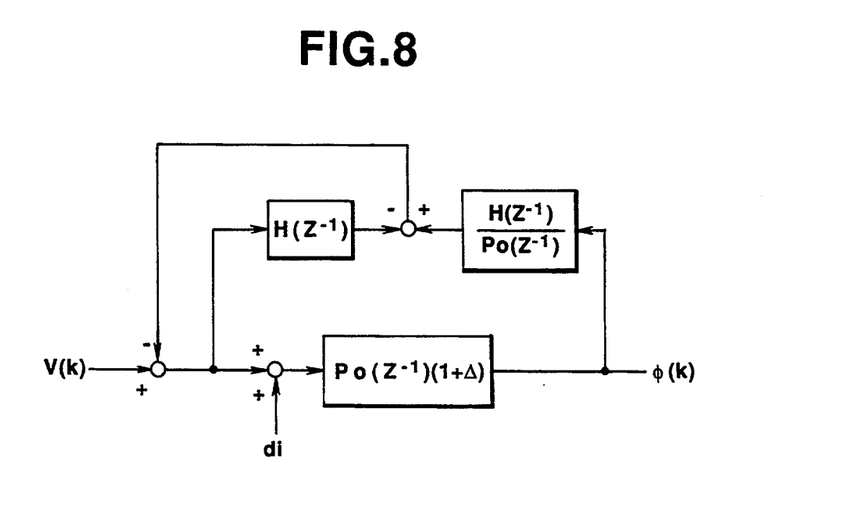
FIG. 8 is a circuit block diagram of a robust compensator applicable to a servo calculating block of positioning the rear tire steering angle in the second preferred embodiment shown in FIG. 7.

If the compensator is constituted as shown in FIG. 8 for the controlled object represented by the equation (25), the motor rotation angle $\phi(k)$ is represented by an equation (26).

Figure 9A:
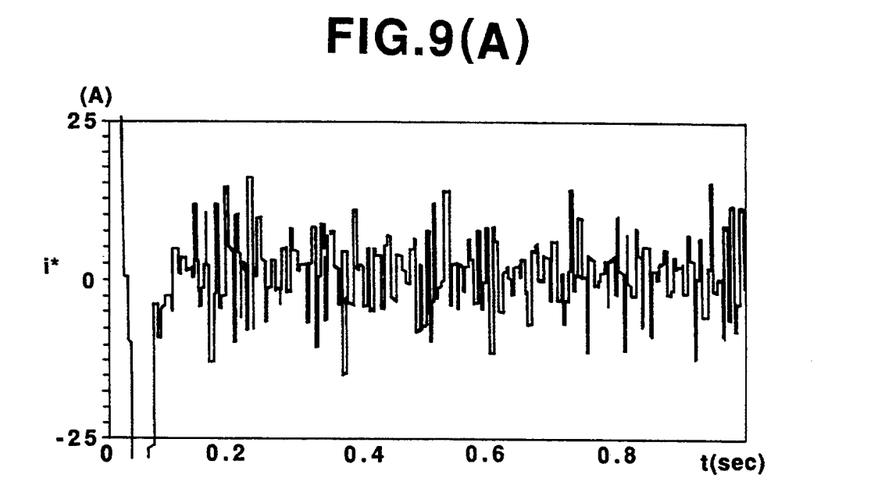
Figure 9B:
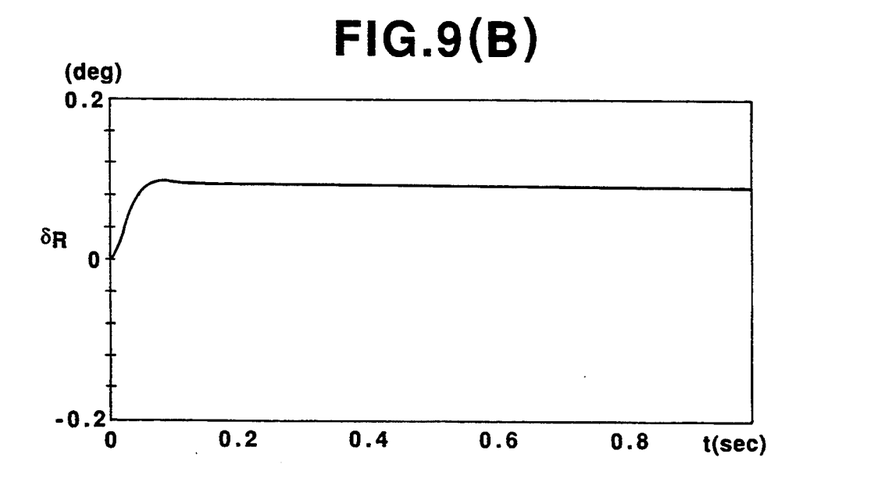

FIGS. 9 (A) and 9 (B) show simulation results of step responses in a case where the rear tire wheel steering angle positioning servo calculating block 9b (provided that the low-pass filter 9c is not operated and the input of the actuator control system is directly output, respectively. In this case, the current command value i* becomes considerably vibratile which is not preferred.

Figure 10A:
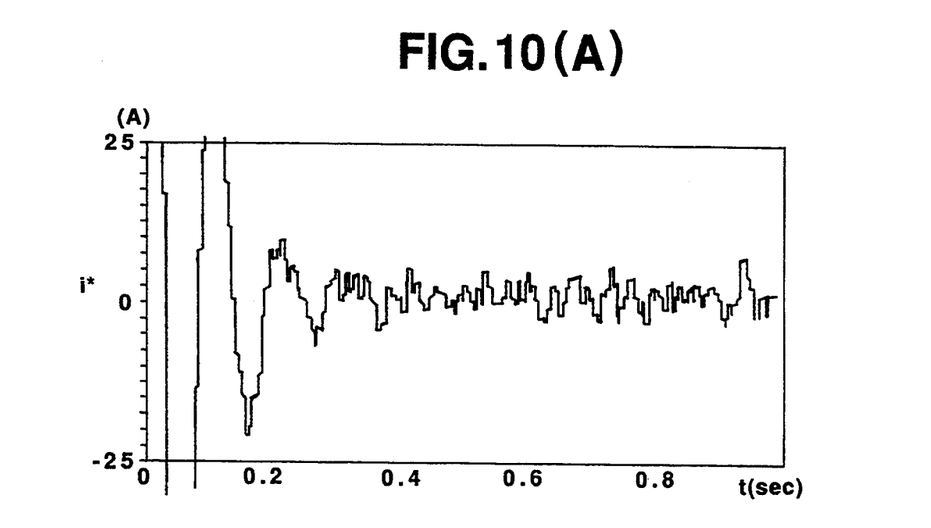
Figure 10B:
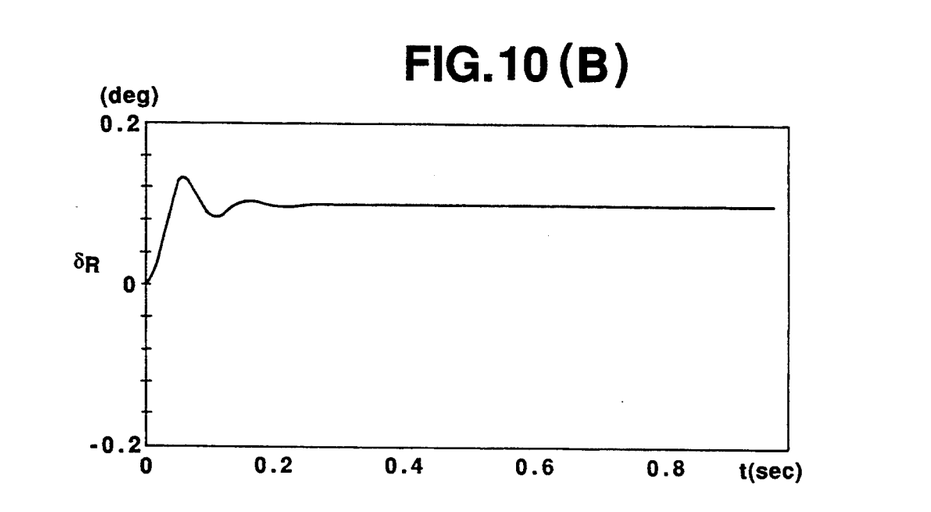

FIGS. 10 (A) and 10 (B) show simulation results in a case where the low-pass filter having the constant cut-off frequency characteristic is used.

In this case, although the vibration level of the current command value i* is reduced, the response of the rear tire steering wheel becomes vibratile which is undesirable. This is because the influence of the low-pass filter causes the rotation speed of the motor not to be fedback in the control system and an insufficient damping force is obtained.

Figure 11A:
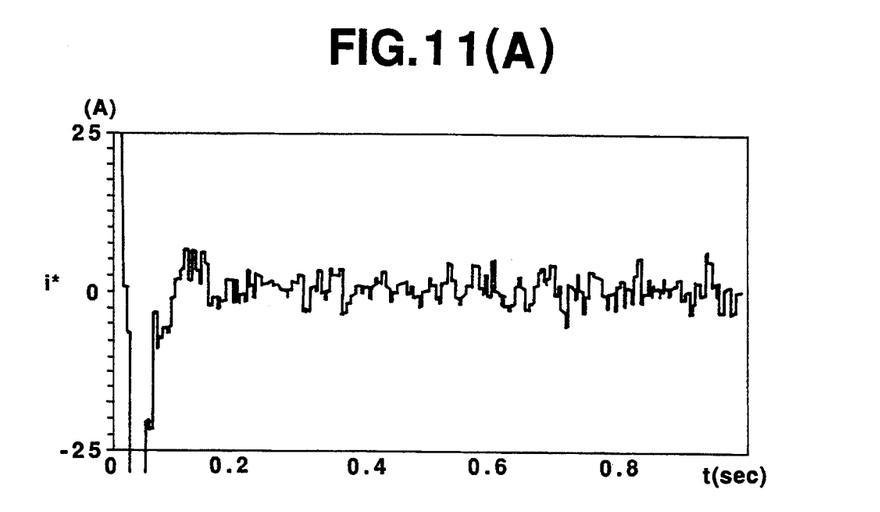
Figure 11B:
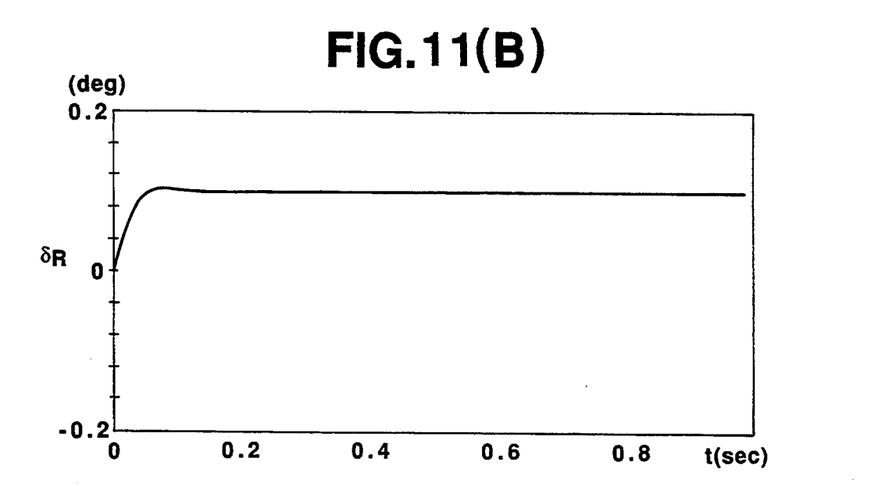

FIGS. 11 (A) and 11 (B) show step response simulation results in which the cut-off frequency of the low-pass filter 9c becomes continuously high in accordance with the increase in the motor rotation speed.

In this case, since the cut-off frequency is set at 10 Hz when the motor rotation speed is zero and directly passing when the motor rotation speed exceeds 2000 rpm, the motor rotation speed is correctly fedback to the control system suppressing the noise components at the region in which the motor rotation speed is low. The vibration level of the current command value i* can be suppressed up to the same level as in FIG. 10. In addition, the response of the rear tire wheel steering angle is the same as in FIG. 9 (B). The vibratile response raised in the case of FIG. 10 (B) was not indicated.

As described above, in the actuator control system in the second preferred embodiment, the low-pass filter having the cut-off frequency characteristic which is continuously varied according to the motor rotation speed when eliminating the noise superposed on the output signal from the worm wheel rotation sensor 5, the vibration prevention of the current command value i* at the low rotation speed region in which the motor rotation speed is low and improvement in the convergence response characteristic of the rear tire wheel steering angle $\delta_R$ at a high motor rotation speed region can be achieved. Consequently, the optimum actuator operation can be secured irrespective of the rotation speed of the motor.

The present invention is not limited to the preferred embodiment described above.

The present invention is also applicable to every servo system with low resolution sensor and large number of noise components superposed on the operation detection signal used as the feedback signal such as an electronically controlled throttle device disclosed in, e.g., a Japanese Patent Application First Publication No. Showa 59-153945.

As described hereinabove, since in the actuator control system according to the present invention, applicable to every servo system having the low resolution sensor and/or sensor signal having the large number of noise components, the variable noise eliminating means whose characteristic of noise elimination is variable according to the operating condition of the actuator, the prevention of vibration in the actuator irrespective of the operating condition of the actuator and favorable response of the actuator can be achieved.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

TABLE 1

| | |
|---|---|
| $GI(S) = i(S)/i^*(S)$ | (1) |
| $I \cdot KT = J\ddot{\phi} + D\dot{\phi}$ | (2) |
| $P(S) = \dot{\phi}(S)/i(S)$ | (3) |
| $\quad = \{KT/J\}/\{S(S + D/J)\}$ | |
| $P(Z^{-1}) = (1 - Z^{-1})Z[(1/S) \cdot P(S)]$ | (4) |
| $\quad = \{Z^{-1}(b_{p0} + b_{p1} \cdot Z^{-1})\}/$ | |
| $\quad \{1 + a_{p1} \cdot Z^{-1} + a_{p1} \cdot Z^{-2}\}$ | |
| $P(Z^{-1}) = [\{Z^{-1}(b_{p0} + b_{p1})\}/\{1 + a_{p1} \cdot Z^{-1} + a_{p2} \cdot Z^{-2}\}] \cdot$ | (5) |
| $\quad [(b_{p0} + b_{p1} \cdot Z^{-1})/(b_{p0} + b_{p1})]$ | |
| $Q(Z^{-1}) = (b_{p0} + b_{p1} \cdot Z^{-1})/B_0$ | (6) |

TABLE 1-continued

| | |
|---|---|
| $B_0 = b_{p0} + b_{p1}$ | (7) |
| $A_p(Z^{-1}) = 1 + a_{p1} \cdot Z^{-1} + a_{p2} \cdot Z^{-2}$ | (8) |
| $P(Z^{-1}) = [(Z^{-1} \cdot B_0)/A_p(Z^{-1})] \cdot Q(Z^{-1})$ | (9) |
| $Gm(Z^{-1}) = (1 - Z^{-1})Z[(1/S) \cdot Gm(S)] \cdot Q(Z^{-1})$ | (10) |
| $\quad = [\{Z^{-1}(bm0 + bm1 \cdot Z^{-1})\}/$ | |
| $\quad \{1 + am1 \cdot Z^{-1} + am2 \cdot Z^{-2}\}] \cdot Q(Z^{-1})$ | |

TABLE 2

| | |
|---|---|
| $I^*(k) = \{1/R(Z^{-1})\} \cdot \{Bm'(Z^{-1})Q^*(k) - L(Z^{-1})\phi(k)\}$ | (11) |
| $\phi(k) = P(Z^{-1}) \cdot i^*(k)$ | (12) |
| $\quad = [\{Z^{-1} \cdot B0\}/\{A_p(Z^{-1})\}] \cdot Q(Z^{-1}) \cdot i^*(k)$ | |
| $G(Z^{-1}) = \{Z^{-1} \cdot B0 \cdot Q(Z^{-1}) \cdot B'm(Z^{-1})\}/$ | (13) |
| $\quad \{A_p(Z^{-1}) \cdot R(Z^{-1}) + Z^{-1} \cdot B0 \cdot Q(Z^{-1}) \cdot L(Z^{-1})\}$ | |
| $B'm(Z^{-1}) \cdot B0 = bm0 + bm1 \cdot Z^{-1}$ | (14) |
| $A_p(Z^{-1}) \cdot R(Z^{-1}) + Z^{-1} \cdot B0 \cdot Q(Z^{-1}) \cdot L(Z^{-1}) = $ | (15) |
| $\quad 1 + am1 \cdot Z^{-1} + am2 \cdot Z^{-2}$ | |
| $R(Z^{-1}) = 1 + rZ^{-1}$ | (16) |
| $L(Z^{-1}) = L0 + L1Z^{-1}$ | (17) |
| $(1 + a_{p1} \cdot Z^{-1} + a_{p2} \cdot Z^{-2})(1 + rZ^{-1}) + Z^{-1}B\{b_{p0} + b_{p1} \cdot Z^{-1}\}/B0\} \cdot (L0 + L1Z^{-1}) = 1 + (a_{p1} + r + b_{p0} \cdot L0) Z^{-1} + $ | (18) |
| $\quad (a_{p2} + r \cdot a_{p1} + b_{p0} \cdot L1 + b_{p1} \cdot L0) Z^{-2} + $ | |
| $\quad (r \cdot a_{p2} + b_{p1} \cdot L1)Z^{-3}$ | |

TABLE 3

| | |
|---|---|
| $a_{p1} + r + b_{p0} \cdot L0 = am1$ | (19) |
| $a_{p2} + r \cdot a_{p1} + b_{p0} \cdot L1 + b_{p1} \cdot L0 = am2$ | (20) |
| $r \cdot a_{p2} + b_{p1} \cdot L1 = 0$ | (21) |
| $L0 = \{(am2 - a_{p2}) \cdot b_{p0} - (am1 - a_{p1}) \cdot b_{p1}\}/$ | (22) |
| $\quad \{b_{p0}(-a_{p1}/a_{p2} + b_{p0}) + b_{p1}^2/a_{p2}\}$ | |
| $L1 = (am1 = a_{p1} + L1 \cdot b_{p1}/a_{p2})/b_{p0}$ | (23) |
| $r = -L1 \cdot b_{p1}/a_{p2}$ | (24) |
| $P(Z^{-1}) = Po(Z^{-1})(1 + \Delta) + di$ | (25) |
| $\phi(k) = \{(1 + \Delta)/(1 + \Delta Hz^{-1})\} \cdot Po(Z^{-1}) \cdot \{V(k) + $ | (26) |
| $\quad (1 - H(Z^{-1})) \cdot di\}$ | |

What is claimed is:

1. A control system for an actuator, the actuator being operated in response to an operation signal input thereto, comprising:

a) first means for detecting an operating state of the actuator;

b) second means for calculating the operation signal on the basis of a detection signal derived from said first means;

c) third means for calculating a condition signal on the basis of an operation speed of the actuator; and d) fourth means for eliminating noise components from the detection signal derived from said first means and for supplying a noise eliminated detection signal to said second means, said fourth means having a variable noise eliminating characteristic which is varied on the basis of the condition signal derived from said third means.

2. A control system for an actuator, the actuator being operated in response to an operation signal input thereto, as set forth in claim 1, wherein said fourth means comprises a low-pass filter, and said noise eliminating characteristic is defined by a cut-off frequency of the low-pass filter such that the cut-off frequency is set to be relatively low when the operation speed is relatively low and is set to be relatively high when the operation speed is relatively high.

3. A control system for an actuator, the actuator being operated in response to an operation signal input thereto, as set forth in claim 2, wherein said cut-off frequency is directly set over a continuous range according to the operation speed of the actuator.

4. A control system for an actuator, the actuator being operated in response to an operation signal input thereto, as set forth in claim 3, wherein said actuator includes a DC motor; a worm gear linked to an output shaft of the DC motor; a worm wheel geared to the worm gear; a rack linked to said worm wheel; a tie rod linked to said rack; and a knuckle arm linked to said tie rod and a rear tire wheel of an automotive vehicle and wherein said first means includes a worm wheel rotation sensor having a potentiometer. wherein said second means includes a steering wheel angle command value calculating block which calculates a rear tire wheel steering angle command value on the basis of the detected steering angle and vehicle speed and calculates a motor rotation angle command value according to the rear tire wheel steering angle command value.

5. A control system for an actuator, the actuator being operated in response to an operation signal input thereto, comprising:
   a) first means for detecting an operating state of the actuator;
   b) second means for calculating the operation signal on the basis of a detection signal derived from said first means;
   c) third means for calculating a condition signal on the basis of an operation speed of the actuator;
   d) fourth means for eliminating noise components from the detection signal derived from said first means and for supplying a noise eliminated detection signal to said second means, said fourth means having a variable noise eliminating characteristic which is varied on the basis of the condition signal derived from said third means.
   wherein said cut-off frequency is directly set over a continuous range according to the operation speed of the actuator, and
   wherein said actuator includes a DC motor; a worm gear linked to an output shaft of the DC motor: a worm wheel geared to the worm gear; a rack linked to said worm wheel; a tie rod linked to said rack; and a knuckle arm linked to said tie rod and a rear tire wheel of an automotive vehicle and wherein said first means includes a worm wheel rotation sensor having a potentiometer: and said control system further comprising
   a first sensor for detecting a steering angle of a vehicular steering system and a second sensor for detecting a vehicle speed, and
   wherein said second means includes a steering wheel angle command value calculating block which calculates a rear tire wheel steering angle command value on the basis of the detected steering angle and vehicle speed and calculates a motor rotation angle command value according to the rear tire wheel steering angle command value.

6. A control system for an actuator, the actuator being operated in response to an operation signal input thereto, as set forth in claim 5, wherein said second means further includes a rear tire wheel steering angle positioning servo calculating block which calculates a current command value to flow into the DC motor according to the motor rotation angle command value and actual motor rotation angle.

7. A control system for an actuator, the actuator being operated in response to an operation signal input thereto, as set forth in claim 6, wherein said third means includes an actual motor rotation angle calculating block which converts a voltage value derived from the potentiometer of the worm wheel rotation sensor into a digital value of the motor rotation angle, and includes an adjuster which calculates the motor rotation speed based on said motor rotation angle, and wherein said low-pass filter receives the digital value of the motor rotation angle from said actual motor rotation angle calculating block and receives the motor rotation speed from said adjuster and filter processes to output the signal as the actual motor rotation angle.

8. A control system for an actuator, the actuator being operated in response to an operation signal input thereto, as set forth in claim 7, wherein said cut-off frequency of the low-pass filter is set to be equal to 10 Hz when the rotation speed of the DC motor is zero and set to be a direct pass when the rotation speed of the DC motor exceeds 2000 rpm.

9. A method for determining an operating variable of an actuator, said actuator being actuated in response to an input operating variable, comprising the steps of:
   a) detecting an operating state of the actuator as the result of an actuation of said actuator in response to the input operating variable;
   b) eliminating noise components from the detected operating state from step a) and outputting a noise eliminated operating state indicative signal; and
   c) receiving the noise eliminated operating state indicative signal output from step b) and calculating the operating variable on the basis of the noise eliminated operating state indicative signal, wherein, at said step b), a noise eliminating characteristic is varied in accordance with the detected operating state of the actuator.

10. A method as claimed in claim 9, wherein said step a) further comprises a step of deriving an operation velocity of the actuator as the operating state of the actuator and wherein, in step b), the noise eliminating characteristic is varied in accordance with the operation velocity of the actuator.

* * * * *